US 9,754,142 B2

(12) United States Patent
Lu et al.

(10) Patent No.: US 9,754,142 B2
(45) Date of Patent: Sep. 5, 2017

(54) METHOD FOR DETECTING THAT CONTACTLESS CPU CARD LEAVES RADIO-FREQUENCY FIELD

(71) Applicant: Feitian Technologies Co., Ltd., Beijing (CN)

(72) Inventors: Zhou Lu, Beijing (CN); Huazhang Yu, Beijing (CN)

(73) Assignee: Feitian Technologies Co., Ltd., Beijing (CN)

( * ) Notice: Subject to any disclaimer, the term of this patent is extended or adjusted under 35 U.S.C. 154(b) by 234 days.

(21) Appl. No.: 14/376,864

(22) PCT Filed: Dec. 21, 2012

(86) PCT No.: PCT/CN2012/087115
§ 371 (c)(1),
(2) Date: Aug. 6, 2014

(87) PCT Pub. No.: WO2013/177926
PCT Pub. Date: Dec. 5, 2013

(65) Prior Publication Data
US 2015/0091699 A1 Apr. 2, 2015

(30) Foreign Application Priority Data
May 30, 2012 (CN) .......................... 2012 1 0174132

(51) Int. Cl.
*G06K 7/10* (2006.01)

(52) U.S. Cl.
CPC ..... *G06K 7/10366* (2013.01); *G06K 7/10128* (2013.01)

(58) Field of Classification Search
CPC .............. G06K 7/10366; G06K 7/10128
See application file for complete search history.

(56) References Cited

U.S. PATENT DOCUMENTS

| 5,887,176 A * | 3/1999 | Griffith .............. G06K 7/10019 340/10.33 |
| 2011/0084811 A1* | 4/2011 | Park ................... G06K 7/10475 340/10.1 |
| 2011/0291803 A1* | 12/2011 | Bajic .................. G08B 13/2462 340/10.1 |

* cited by examiner

*Primary Examiner* — James Yang
(74) *Attorney, Agent, or Firm* — Hammer & Associates, P.C.

(57) ABSTRACT

A method for detecting that a contactless CPU card leaves a radio-frequency field relates to the field of smart cards. The method comprises: receiving and judging whether a valid instruction sent by an upper computer is received, and conducting a corresponding operation according to the received instruction; as a notification card search instruction, conducting a card search operation, and judging whether returned information is received; obtaining card number information about a contactless card according to the returned information; as an APDU instruction, sending A data to the card in accordance with a designated format, judging whether a response is received, and sending the operation result to the upper computer; as an extension instruction, executing a corresponding operation, and sending the operation result to the upper computer; when a valid instruction is not received, judging the mark of the card in the radio-frequency field, and if the card is in the radio-frequency field, conducting a card detection operation, and sending the operation result to the upper computer; and if the card is not in the radio-frequency field, conducting a card search operation. The present invention can detect the problem that a CPU card leaves a radio-frequency field in real time.

10 Claims, 7 Drawing Sheets

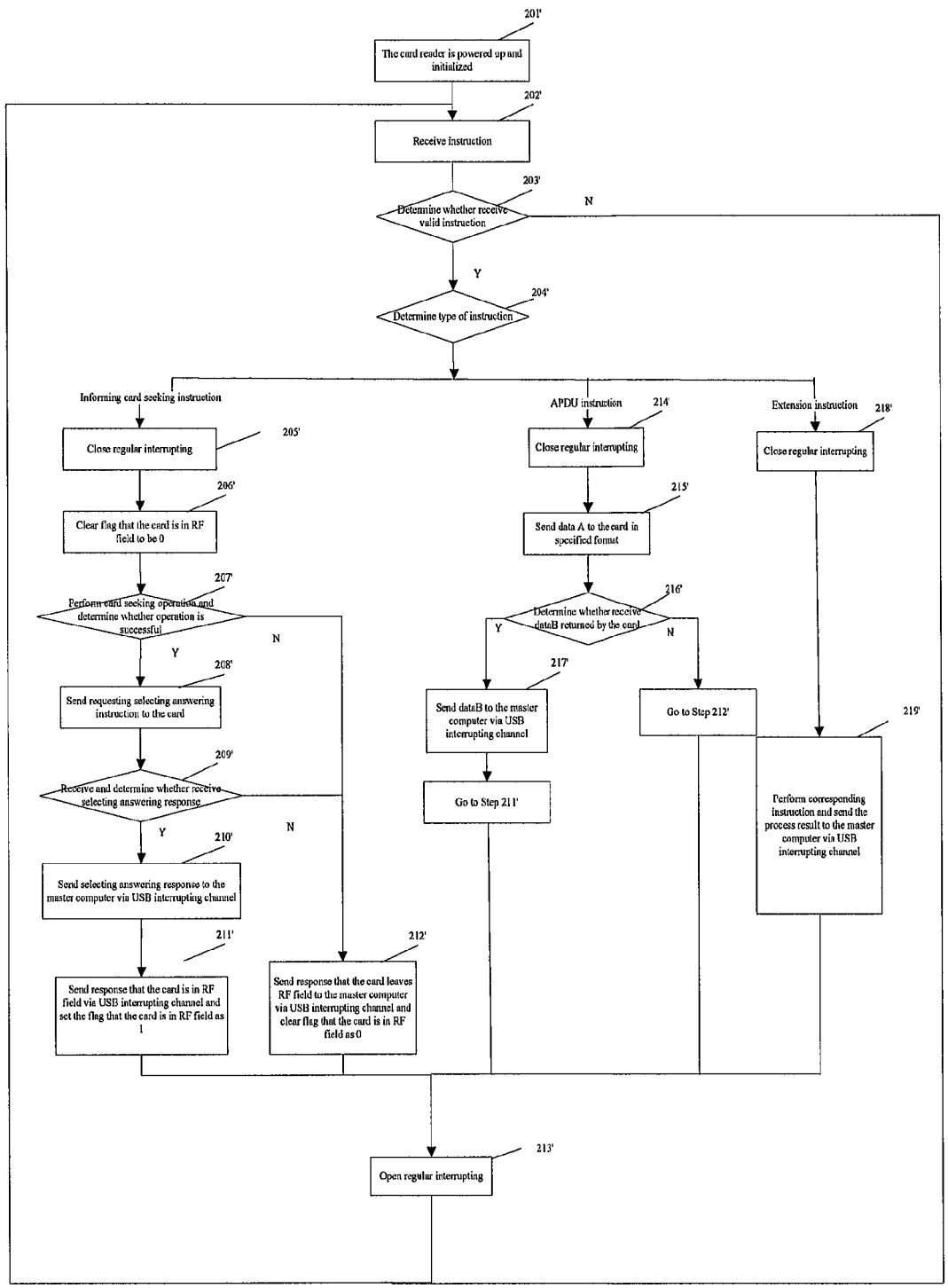
Fig. 2'A

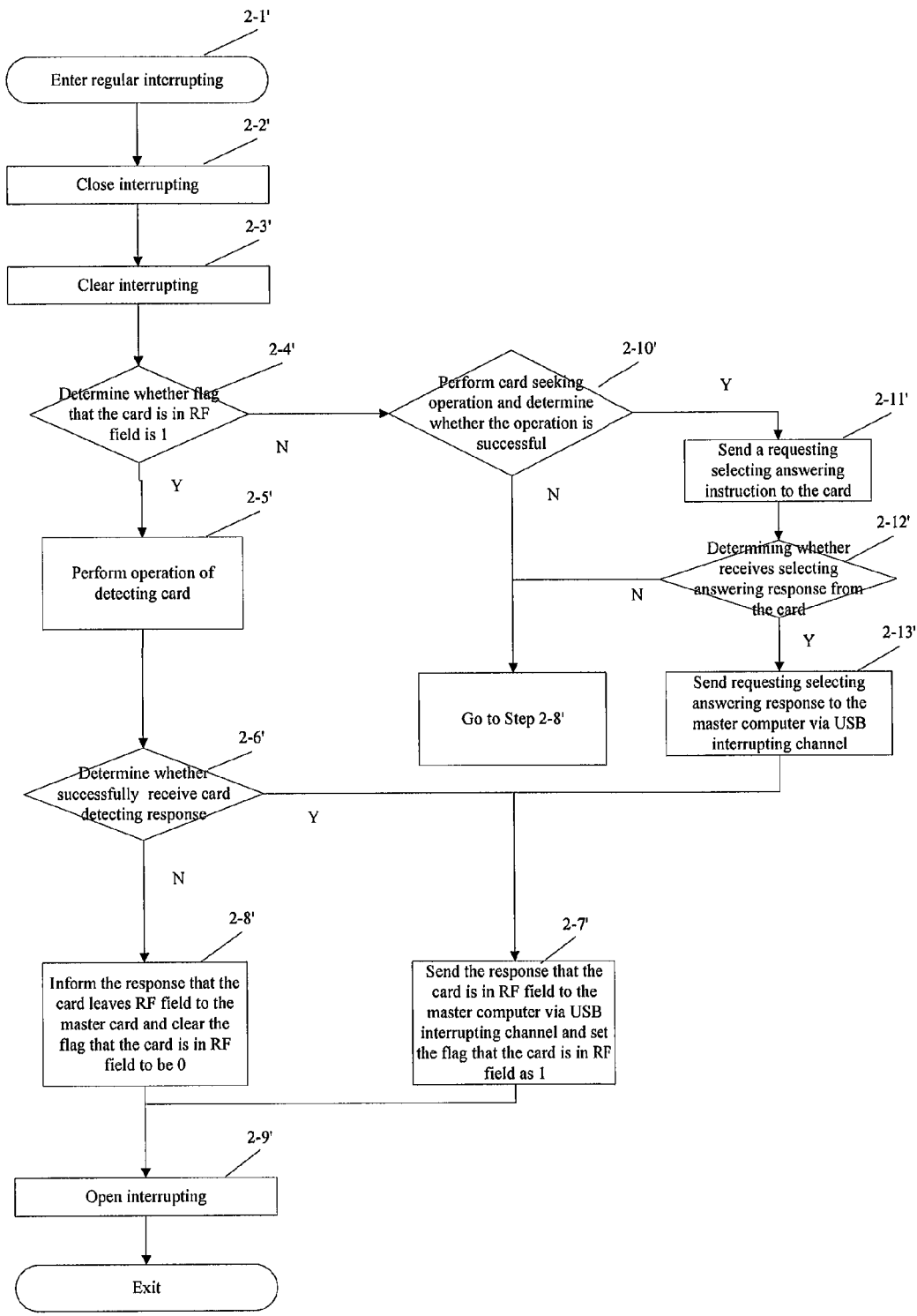
Fig.2'B

METHOD FOR DETECTING THAT CONTACTLESS CPU CARD LEAVES RADIO-FREQUENCY FIELD

TECHNICAL FIELD

The invention relates to smart card field, more particularly relates to a method for detecting whether a contactless CPU card has left a radio frequency field.

PRIOR ART

Contactless card, which is called radio frequency card, is made up of IC chip and inductive antenna which are sealed in a standard PVC card. No part of the chip and the antenna are exposed. Contactless card is a new technology which is developed in recent years. The technology successfully combines radio frequency identification technology and IC card reader and writer together, which solves problem of powerlessness (no power inside a card) and avoids contact and is a great breakthrough in electronic component field. When a card is close to surface of a card reader and writer in a certain distance range (usually from 5-10 mm), data reading and writing operation is completed by transmission of radio wave.

Radio frequency identification performs contactless and bidirectional data transmission between a card reader and a contactless CPU card by radio frequency so as to achieve purpose of target identification and data exchange. Radio frequency identification is classified into low frequency (LF), high frequency (HF) and ultra high frequency (UHF) according to applied frequency; correspondingly, representative frequencies are low frequency lower than 135 KHz, high frequency of 13.56 MHz and ultra frequency of 860-960 MHz respectively; circuit of contactless CPU card includes main parts such as central processing unit (CPU), read only memory (ROM), Random Access Memory (RAM), Electrically Erasable Programmable Read-Only Memory (EEPROM) and chip operating system (COS), etc., which is like an ultra small computer.

In process of detecting contactless CPU card, inventors find that following problems exist in the prior art. After card seeking is activated, operation of detecting whether a card is in the radio frequency field cannot be performed at real time at the time interval of data interaction between the card and a master computer. General method is performing card seeking operation again which will disturb original operation status of the card.

SUMMARY OF THE INVENTION

The object of the present invention is to provide a method for detecting whether a contactless CPU card has left a radio frequency field, which is a method for detecting whether a contactless CPU card leaves radio frequency field at real time without affecting original operation status of the contactless CPU card.

Therefore, the present invention provides a method for detecting whether a contactless CPU card has left radio frequency field, comprising Step A, a card reader obtaining an instruction and determining whether the instruction is valid instruction, if yes, go to Step B; otherwise, go to Step C;

Step B, the card reader determining the type of the valid instruction;

If the type is instruction on informing to seek a card, to Step D;

if the type is APDU instruction, sending the APDU instruction to the card and sending a response returned by the card to a master computer via USB interrupting channel; go back to Step A;

if the type is extension instruction, performing operation according to the extension instruction and sending result of the operation to the master computer via USB interrupting channel; go back to Step A;

Step C, the card reader determining that whether flag of the card in the radio frequency field is set, if yes, go to Step E; otherwise, go to Step D;

Step D, the card reader sending card seeking instruction to the card and determining whether receives a card seeking response returned by the card, if yes, setting the flag of the card in the radio frequency field and sending the response that the card is in the radio frequency field to the master computer via USB interrupting channel; otherwise, resetting the flag of the card in the radio frequency field and sending the response that card leaves the radio frequency field to the master computer via USB interrupting channel; go back to Step A;

Step E, the card reader sending detecting instruction to the card and determining whether receives detecting response returned by the card successfully, if yes, storing the detecting response and go to Step F; otherwise, go to Step G;

Step F, the card reader setting the flag of the card in the radio frequency field, and sending the response that the card is in the radio frequency field to the master computer via USB interrupting channel; go back to Step A;

Step G, the card reader resetting the flag of the card in the radio frequency field and sending the response that the card leaves the radio frequency field to the master computer via USB interrupting channel; go back to Step A.

Preferably, sending response that the card is in the radio frequency field to the master computer via USB interrupting channel specifically comprises determining whether recorded card status is that the card is in the radio frequency field, if yes, go back to Step A; otherwise, updating the recorded card status to be that the card leaves the radio frequency field and go back to Step A;

informing the master computer of the response that the card leaves the radio frequency field via USB interrupting channel specifically comprises determining whether recorded card status is that card leaves radio frequency, if yes, go back to Step A; otherwise, updating the recorded card status to be that card leaves radio frequency field, go back to Step A.

Preferably, determining whether the instruction is valid instruction specifically comprises the card reader receiving instruction sent from buffer via interrupting way; if the first byte of the instruction is identical to a predetermined character, the card reader receiving the valid instruction; otherwise, the card reader does not receive valid instruction.

Preferably, before Step A, the method comprises the card reader being powered up and being initialized and switching on communication interruption enabling;

the method further comprises when the card reader detects communication interrupting, the card reader entering communication interrupting process, which comprises StepS1, the card reader switching off communication interruption enabling and clearing communication interrupting flag;

StepS2, the card reader receiving an instruction issued by the master computer and determining whether the instruction is valid instruction, if yes, setting the flag of the instruction, switching on communication interruption enabling and exiting communication interrupting process; otherwise, switching on communication interruption enabling and exiting communicating interrupting process;

Step A specifically comprises the card reader determining whether the flag of the instruction is set, if yes, resetting the flag of the instruction and go to Step B; if no, go to Step C.

Preferably, determining whether the instruction is valid instruction in Step S2 specifically comprises determining whether the first byte of the instruction is identical to a predetermined character, if yes, valid instruction being received, if no, valid instruction being not received.

Preferably, the card reader sending detecting instruction to the card in Step E specifically comprises if it is the first time that the card reader sends the detecting instruction, the card reader sending a first predetermined character string to the card;

if it is not the first time that the card reader sends the detecting instruction, the card reader determining the detecting instruction to be sent according to the detecting response, if the value of the last bit of the detecting response is 0, the card reader sending a first predetermined character string to the card; if the value of the last bit of the detecting response is 1, the card reader sending a second predetermined character string to the card.

Preferably, determining whether successfully receives the detecting response returned by the card specifically comprises if the detecting instruction is the first predetermined character, the card reader determining whether the received response returned by the card is a first detecting response, if yes, receiving the detecting response returned by the card successfully and storing the response; if no, receiving the detecting response returned by the card unsuccessfully;

if the detecting instruction is the second predetermined character, the card reader determining whether the received response returned by the card is a second detecting response, if yes, receiving the detecting response returned by the card successfully and storing the response; if no, receiving the detecting response returned by the card unsuccessfully.

Preferably, Step B specifically comprises

Step B11, the card reader determining type of the valid instruction, if the type is instruction on informing to seek a card, going to Step D; if the type is APDU instruction, going to Step B12; if the type is extension instruction, going to Step B13;

Step B12, the card reader sending the APDU instruction to the card and determining whether receives a response returned by the card; if yes, setting the flag of the card in the radio frequency field and returning the received response to the master computer via USB interrupting channel; go back to Step A; otherwise, resetting the flag of the card in the radio frequency field and sending the response that the card leaves the radio frequency field to the master computer via USB interrupting channel; go back to Step A;

Step B13, the card reader performing operation according to extension instruction and returning the result of operation to the master computer via USB interrupting channel; go back to Step A.

Preferably, Step D specifically comprises

Step D11, the card reader sending a first requesting instruction to the card and determining whether receives a first response returned by the card, if yes, go to Step D12; otherwise, closing the radio frequency field; waiting for automatically opening radio frequency field in a predetermined time, resetting the flag of the card in the radio frequency field and sending response that the card leaves the radio frequency field to the master computer via USB interrupting channel; go back to Step A;

Step D12, the card reader sending a second requesting instruction containing 0x93 and 0x20 to the card and obtaining first confirming information to the card;

Step D13, the card reader obtaining a first data according to the first confirming information and fixed data and determining whether the first data is 0x00, if yes, cascade level of the card being 1 and storing the card number information in buffer; go to Step D18; otherwise, go to Step D14;

Step D14, the card reader sending a third requesting instruction containing 0x95 and 0x20 to the card and obtaining second confirming information returned by the card;

Step D15, the card reader obtaining a second data according to the second confirming information and the fixed data and determining whether the second data is 0x00, if yes, cascade level of the card being 2 and storing the card number information in the buffer, go to Step D18; otherwise, go to Step D16;

Step D16, the card reader sending a fourth requesting instruction containing 0x97 and 0x20 to the card and obtaining a third confirming information;

Step D17, the card reader obtaining a third data according to the third confirming information and the fixed data and determining whether the third data is 0x00, if yes, cascade level of the card being 3 and storing the card number information in the buffer and go to D18; otherwise, closing radio frequency field; waiting for automatically opening the radio frequency field in a predetermined time, resetting the flag of the card in the radio frequency field and sending the response that the card leaves the radio frequency field to the master computer via USB interrupting channel; go back to Step A;

Step D18, the card reader sending a request selecting and answering instruction to the card and determining whether receives a selecting and answering response returned by the card, if yes, going to Step D19; otherwise, resetting the flag of the card in the radio frequency field and sending the response that card leaves the radio frequency field to the master computer via USB interrupting channel; go back to Step A;

Step D19, the card reader setting the flag of the card in the radio frequency field and sending the selecting and answering response and the response that the card is in the radio frequency field to the master computer via USB interrupting channel; go back to Step A.

Preferably, Step D specifically comprises

Step D21, the card reader sending a fifth requesting instruction to the card and determining whether receives a fifth response returned by the card, if yes, go to Step D22; otherwise, closing the radio frequency field, waiting for automatically opening radio frequency field in a predetermine time, resetting the flag of the card in the radio frequency field and sending the response that the card leaves the radio frequency field to the master computer via USB interrupting channel, go back to Step A;

Step D22, the card reader sending the request selecting and answering instruction and determining whether receives the selecting and answering response returned by the card, if yes, goes to Step D23; otherwise, resetting the flag of the card in the radio frequency field and sending the response that the card leaves the radio frequency field to the master compute via USB interrupting channel; go back to Step A;

Step D23, the card reader setting the flag of the card in the radio frequency field and sending the selecting and answering response and the response that the card is in the radio frequency field to the master computer via USB interrupting channel; go back to Step A.

According to another aspect of the present invention, the present invention provides a method for detecting whether a contactless CPU card has left radio frequency field, comprising Step a, a card reader switching on regular interruption enabling;

Step b, the card reader receiving instruction sent by the master computer and determining whether receives valid instruction, if yes, determining the type of the valid instruction, if the type is instruction on informing to seek a card, goes to Step c; if the type is APDU instruction, go to Step d; if the type is extension instruction, go to Step e; otherwise, go to Step f;

Step c, the card reader switching off regular interruption enabling, sending card seeking instruction to the card and determining whether receives a card seeking response returned by the card, if yes, setting the flag of the card in the radio frequency field and switching on regular interruption enabling, goes to Step f; otherwise, resetting the flag of the card in the radio frequency field and switching on regular interruption enabling, go to Step f;

Step d, the card reader switching off regular interruption enabling, sending the APDU instruction to the card and determining whether receives a response returned by the card, if yes, setting the flag of the card in the radio frequency field, sending the received response to the master computer via USB interrupting channel and switching on regular interruption enabling, go to Step f; otherwise, resetting the flag of the card in the radio frequency field and switching on regular interruption enabling, go to Step f;

Step e, the card reader switching off regular interruption enabling, performing operation according to the extension instruction, sending the operation result to the master computer via USB interrupting channel and switching on regular interruption enabling, go to Step f;

Step f, the card reader determining whether the flag of the card in the radio frequency field is set, if yes, sending the response that the card is in the radio frequency field to the master computer via USB interrupting channel, go back to Step a; otherwise, sending the response that the card leaves the radio frequency field to the master computer via USB interrupting channel, go back to Step a;

when the card reader receives triggering of regular interrupting, entering regular interrupting process, comprising Step g, the card reader switching off regular interruption enabling and clearing regular interrupting flag Step h, the card reader determining whether the flag of the card in the radio frequency field is set, if yes, go to Step l otherwise, sending card seeking instruction to the card and determining whether receiving a card seeking response returned by the card, if yes, go to Step l; otherwise, go to Step m;

Step i, the card reader sending detecting instruction to the card and determining whether receives a detecting response returned by the card, if yes, storing the detecting response and go to Step l; otherwise, go to Step m;

Step l, the card reader switching on regular interruption enabling, exiting regular interrupting process;

Step m, the card reader resetting the flag of the card in the radio frequency field, switching on regular interruption enabling, exiting regular interrupting process.

Preferably, Step c specifically comprises

Step c11, the card reader switching off regular interruption enabling, sending a first requesting instruction to the card, determining whether receives a first response returned by the card, if yes, go to Step c12; otherwise, closing radio frequency field, waiting for automatically opening radio frequency filed in a predetermined time, resetting the flag of the card in the radio frequency field and switching on regular interruption enabling, go to Step f;

Step c12, the card reader sending a second requesting instruction containing 0x9 3 and 0x20 to the card and obtaining a first confirming information returned by the card;

Step c13, the card reader obtaining a first data according to a first confirming information and fixed data and determining whether a first data is 0x00, if yes, cascade level of the card being 1, storing card number information in buffer, go to Step c18; otherwise, go to Step c14;

Step c14, the card reader sending a third requesting instruction containing 0x95 and 0x20 to the card and obtaining a second confirming information returned by the card;

Step c15, the card reader obtaining a second data according to the second confirming information and the fixed data and determining whether the second data is 0x00, if yes, cascade level of the card being 2 and storing card number information in the buffer, go to Step c18; otherwise, go to Step c16;

Step c16, the card reader sending a fourth requesting instruction containing 0x97 and 0x20 to the card and obtaining a third confirming information;

Step c17, the card reader obtaining a third data according to the third confirming information and fixed data and determining whether the third data is 0x00, if yes, cascade level of the card being 3 and storing card number information in the buffer, go to Step c18; otherwise, closing the radio frequency field, waiting for automatically opening radio frequency field in a predetermined time, resetting the flag of the card in the radio frequency field and switching on regular interruption enabling, go to Step f;

Step c18, the card reader sending request selecting and answering instruction to the card and determining whether receives a selecting and answering response returned by the card, if yes, go to Step c19; otherwise, resetting the flag of the card in the radio frequency field and switching on regular interruption enabling; go to Step f;

Step c19, the card reader setting the flag of the card in the radio frequency field and sending the selecting and answering response to the master computer via USB interrupting channel and switching on regular interruption enabling, go to Step f.

Preferably, Step c specifically comprises

Step c21, the card reader switching off regular interruption enabling, sending a fifth requesting instruction to the card and determining whether receives a fifth response returned by the card, if yes, go to Step c22, otherwise, closing radio frequency field and waiting for automatically opening radio frequency field, resetting the flag of the card in the radio frequency field and switching on regular interruption enabling; go to Step f;

Step c22, the card reader sending a request selecting and answering instruction to the card and determining whether receives a selecting and answering response returned by the card, if yes, goes to Step c23; otherwise, resetting the flag of the card in the radio frequency field and switching on regular interruption enabling; go to Step f;

Step c23, the card reader setting the flag of the card in the radio frequency field, sending the selecting and answering response to the master computer and switching on regular interruption enabling, go to Step f.

Preferably, if no valid instruction is received in Step b, going on waiting for receiving instruction;

Steps c to f, Steps l to m are replaced with Steps c' to e' and Steps l' to m' respectively;

Step c', the card reader switching off regular interruption enabling and sending card seeking instruction to the card and determining whether a card seeking response is returned by the card, if yes, setting the flag of the card in the radio frequency field and sending the response that the card is in the radio frequency field to the master computer via USB interrupting channel; go back to Step a; otherwise, resetting the flag of the card in the radio frequency field and sending a response that the card leaves radio frequency field to the master computer via USB interrupting channel, go back to Step a;

Step d', the card reader switching off regular interruption enabling, sending the APDU instruction to the card and determining whether receives a response returned by the card, if yes, setting the flag of the card in the radio frequency field and sending the received response and the response that the card is in the radio frequency field to the master computer via USB interrupting channel, go back to Step a; otherwise, resetting the flag of the card in the radio frequency field and sending the response that the card is in the radio frequency field to the master computer via USB interrupting channel, go back to Step a;

Step e', the card reader switching off regular interruption enabling, performing operation according to the extension instruction and sending the operation result to the master computer via USB interrupting channel, go back to Step a;

Step l', the card reader setting the flag of the card in the radio frequency field, sending the response that the card is in the radio frequency field to the master computer via USB interrupting channel, switching on regular interruption enabling and exiting regular interrupting process;

Step m', the card reader resetting the flag of the card in the radio frequency field, sending the response that the card leaves the radio frequency field to the master computer via USB interrupting channel, switching on regular interruption enabling and exiting regular interrupting process.

Preferably, Step c' specifically comprises

Step c'11, the card reader switches off regular interruption enabling, sending a first requesting instruction to the card and determining whether receives a first response returned by the card, if yes, go to Step c'12; otherwise, closing radio frequency field, waiting for automatically opening radio frequency field in a predetermined time, resetting the flag of the card in the radio frequency field and sending the response that the card leaves the radio frequency field to the master computer via USB interrupting channel, go back to Step a;

Step c'12, the card reader sending a second requesting instruction containing 0x93 and 0x20 to the card and obtaining first confirming information returned from the card;

Step c'13, the card reader obtaining a first data according to the first confirming information and fixed data and determining whether the first data is 0x00, if yes, cascade level of the card being 1 and storing the card number information in buffer, go to Step c'18; otherwise, go to Step c'14;

Step c'14, the card reader sending a third requesting instruction containing 0x95 and 0x20 to the card and obtaining second confirming information returned by the card;

Step c'15, the card reader obtaining a second data according to the second confirming information and the fixed data and determining whether the second data is 0x00, if yes, cascade level of the card is 2 and storing the card number information in the buffer, go to Step c'18; otherwise, go to Step c'16;

Step c'16, the card reader sending a fourth requesting instruction containing 0x97 and 0x20 to the card and obtaining a third confirming information;

Step c'17, the card reader obtaining a third data according to the third confirming information and the fixed data and determining whether the third data is 0x00, if yes, cascade level of the card being 3 and storing the card number information in buffer, go to Step c'18; otherwise, closing radio frequency field, waiting for automatically opening radio frequency field in a predetermined time, restoring the flag of the card in the radio frequency field and sending the response that the card leaves the radio frequency field to the master computer via USB interrupting channel, go back to Step a;

Step c'18, the card reader sending a request selecting and answering instruction to the card and determining whether receives a selecting and answering response returned by the card, if yes, go to Step c'19; otherwise, resetting the flag of the card in the radio frequency field and sending the response that card leaves the radio frequency field to the master computer via USB interrupting channel, go back to Step a;

Step c'19, the card reader setting the flag of the card in the radio frequency field and sending the selecting and answering response and the response that the card is in the radio frequency field to the master computer via USB interrupting channel; go back to Step a.

Preferably, Step c' specifically comprises

Step c'21, the card reader switching off regular interruption enabling and sending a fifth requesting instruction to the card and determining whether receives a fifth response returned from the card, if yes, go to Step c'22; otherwise, closing radio frequency field, waiting for automatically opening on radio frequency field in a predetermined time, resetting the flag of the card in the radio frequency field and sending the response that the card leaves the radio frequency field to the master computer via USB interrupting channel, go back to Step a;

Step c'22, the card reader sending a request selecting and answering instruction to the card and determining whether receives the selecting and answering response returned by the card, if yes, go to Step c'23; otherwise, resetting the flag of the card in the radio frequency field and sending the response that the card leaves the radio frequency field to the master computer via USB interrupting channel; go back to Step a.

Preferably, sending the response that the card is in the radio frequency field to the master computer via USB interrupting channel specifically comprises determining whether the recorded card status is that the card is in the radio frequency field, if yes, go back to Step a, otherwise, updating the recorded card status to be that the card is in the radio frequency field, go back to Step a;

sending the response that the card leaves the radio frequency field to the master computer via USB interrupting channel specifically comprises determining whether recorded card status is that card leaves radio frequency field, if yes, go back to Step a; otherwise, updating the recorded card status to be that card leaves radio frequency field; go back to Step a.

Preferably, determining whether the instruction is valid instruction specifically comprises the card reader receiving an instruction sent from the buffer via interrupting; if the first byte of the instruction is identical to a predetermined character, the valid instruction is received; otherwise, no valid instruction is received.

Preferably, the card reader sending a detecting instruction to the card specifically comprises if it is the first time that the card sends the detecting instruction, the card reader sending a first predetermined character to the card;

if it is not the first time that the card sends the detecting instruction, the card reader determines the detecting instruction to be sent according to the detecting response, if the value of the last bit of the detecting response is 0, the card reader sends the first predetermined character string to the card; if the value of the last bit of the detecting response is 1, the card reader sending a second predetermined character string to the card.

Preferably, determining whether successfully receives the detecting response returned by the card specifically comprises if the detecting instruction is the first predetermined character string, the card reader determines whether the response returned by the card is a first detecting response, if yes, successfully receiving the detecting response returned by the card and storing the response; if no, unsuccessfully receiving the detecting response returned by the card;

if the detecting instruction is the second predetermined character string, the card reader determines whether the response returned by the card is a second detecting response, if yes, successfully receiving the detecting response returned by the card and storing the response; if no, unsuccessfully receiving the detecting response returned by the card.

The advantage of the present invention is that in free time, the card reader will send a detecting instruction to the card regularly so as to realize detecting whether the card is in the radio frequency field at real time.

BRIEF DESCRIPTION OF THE ACCOMPANYING DRAWINGS

Figure 2A:
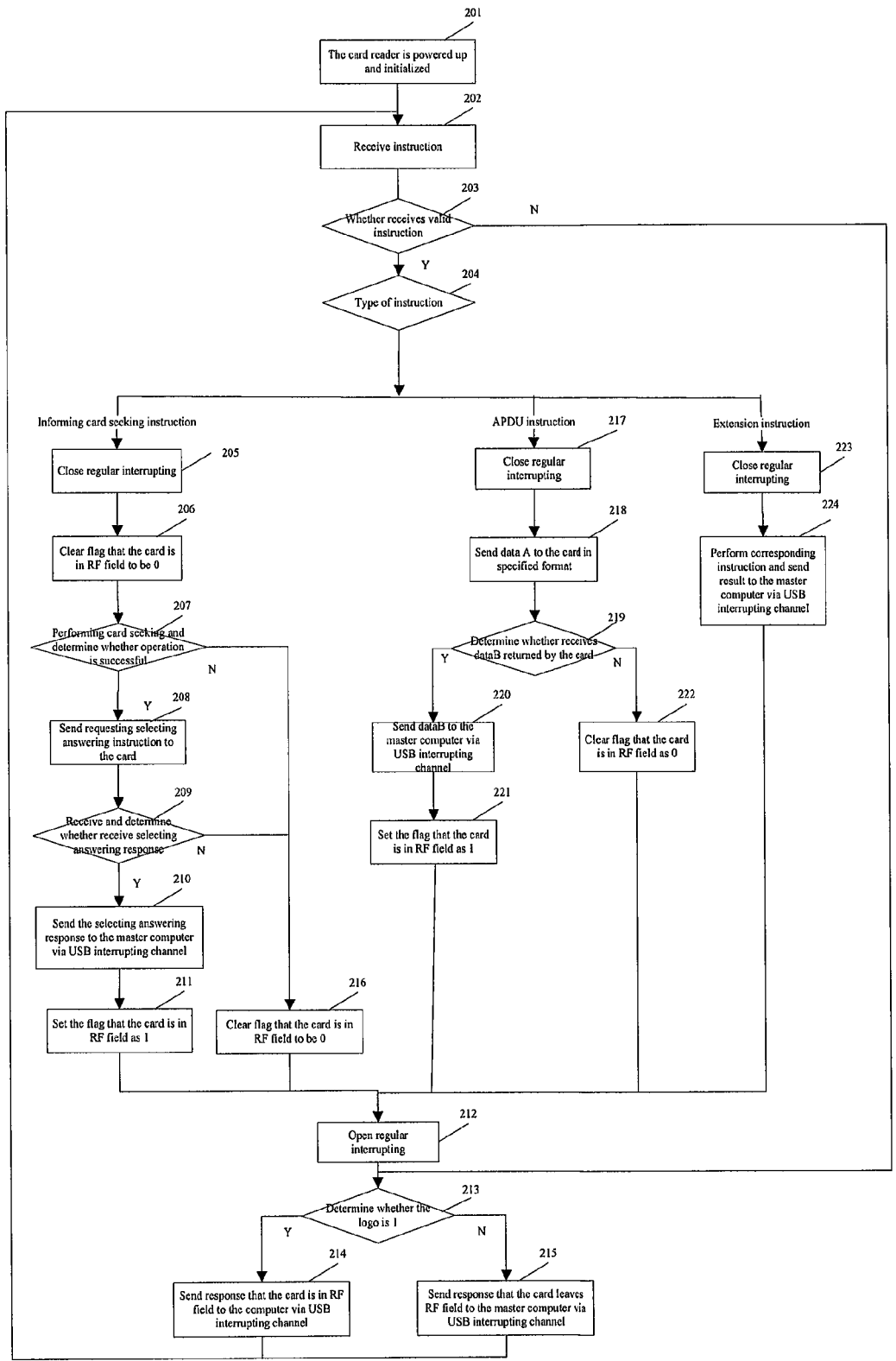
FIG. 2A and FIG. 2B are flow charts of a detailed method for detecting whether a contactless CPU card has left radio frequency field provided by Embodiment 2 of the present invention.
Figure 2B:
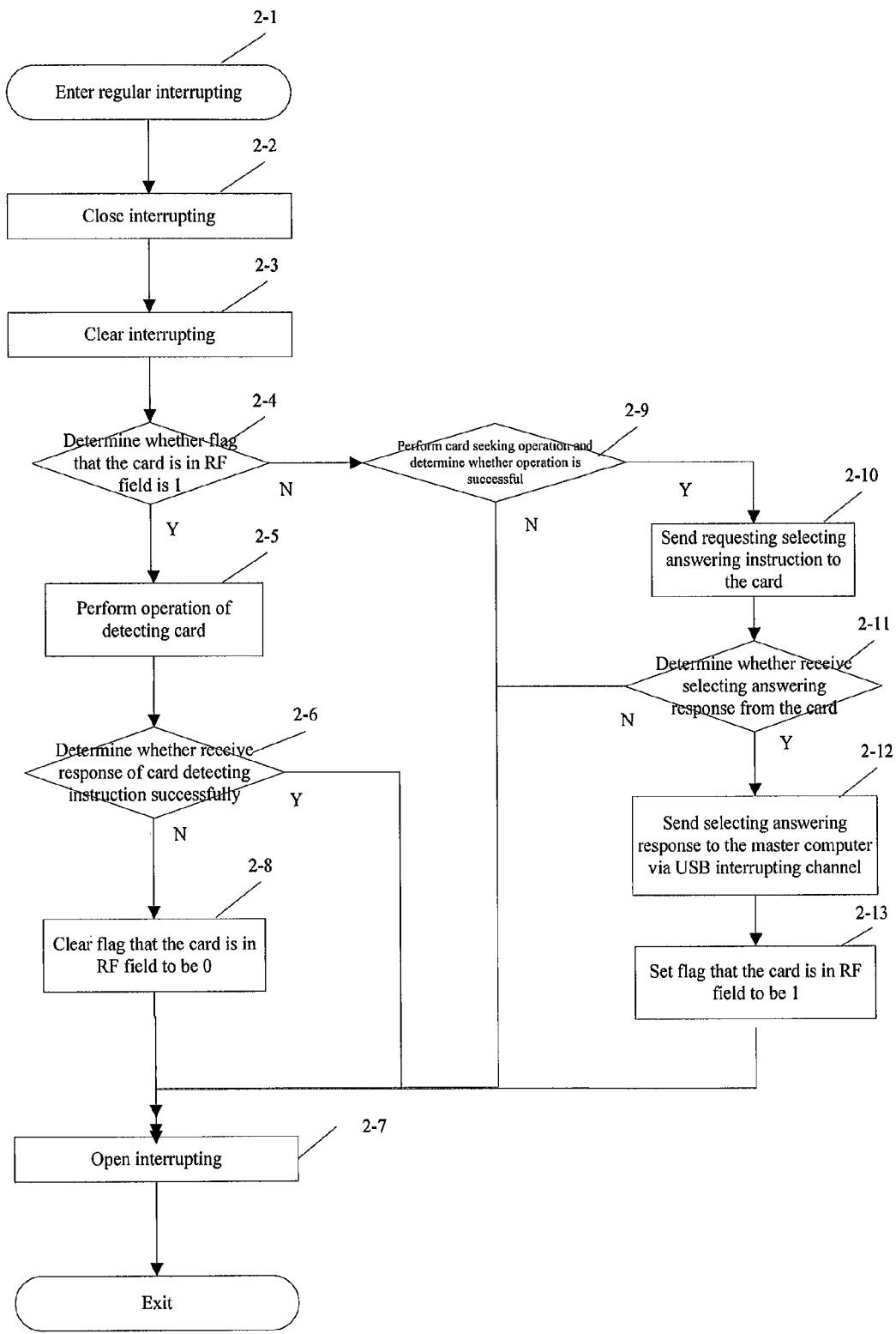
Figure 3A:
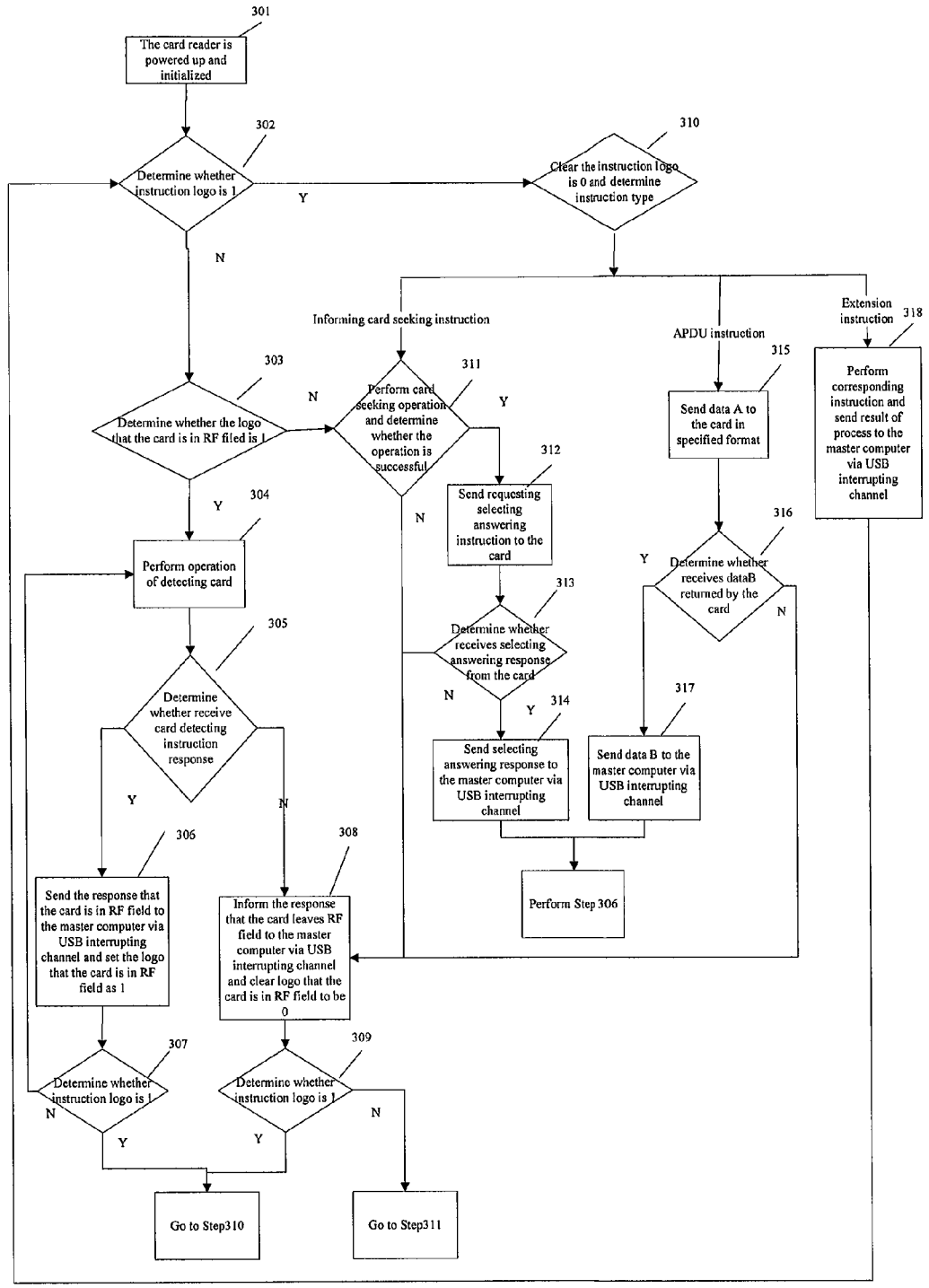
Figure 3B:
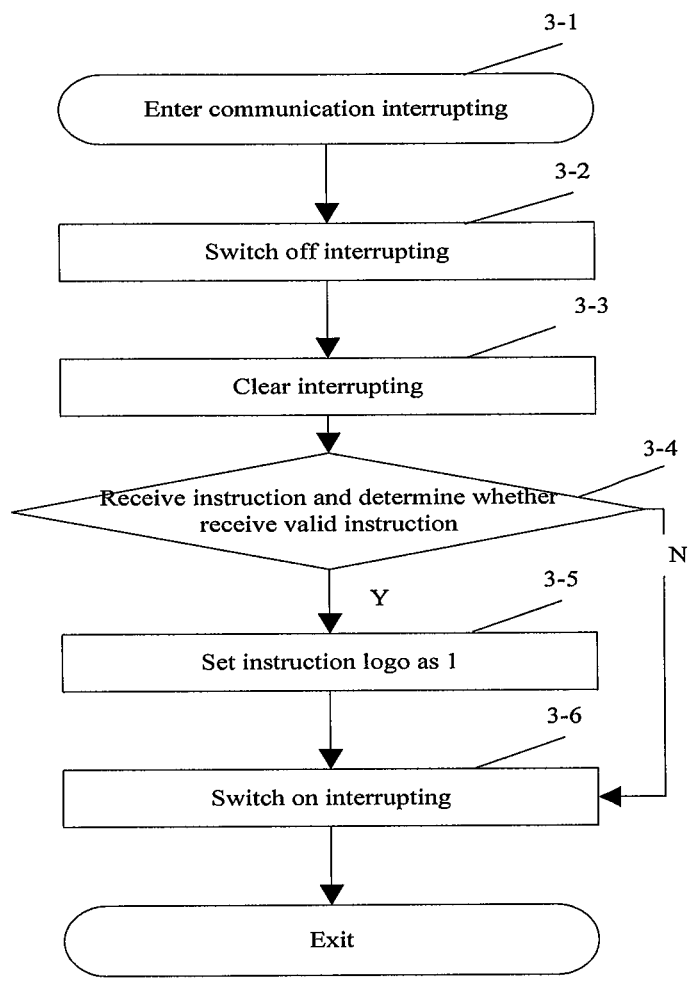

FIG. 2'A and FIG. 2'B are flow charts of a detailed method for detecting whether a contactless CPU card has left radio frequency field provided by a variation of Embodiment 2 of the present invention; and FIG. 3A and FIG. 3B are flow charts of a detailed method for detecting whether a contactless CPU card has left radio frequency field provided by Embodiment 3 of the present invention.

DETAILED DESCRIPTION OF THE INVENTION

In order to make the purpose, technical solution and advantages of the present invention become more clear, further detailed description of the embodiment of the present invention is presented by combining accompany drawings.

In the embodiments of the present invention, for example, mentioned card reader is a contactless card reader and mentioned card is a contactless CPU card.

Embodiment 1

Figure 1:
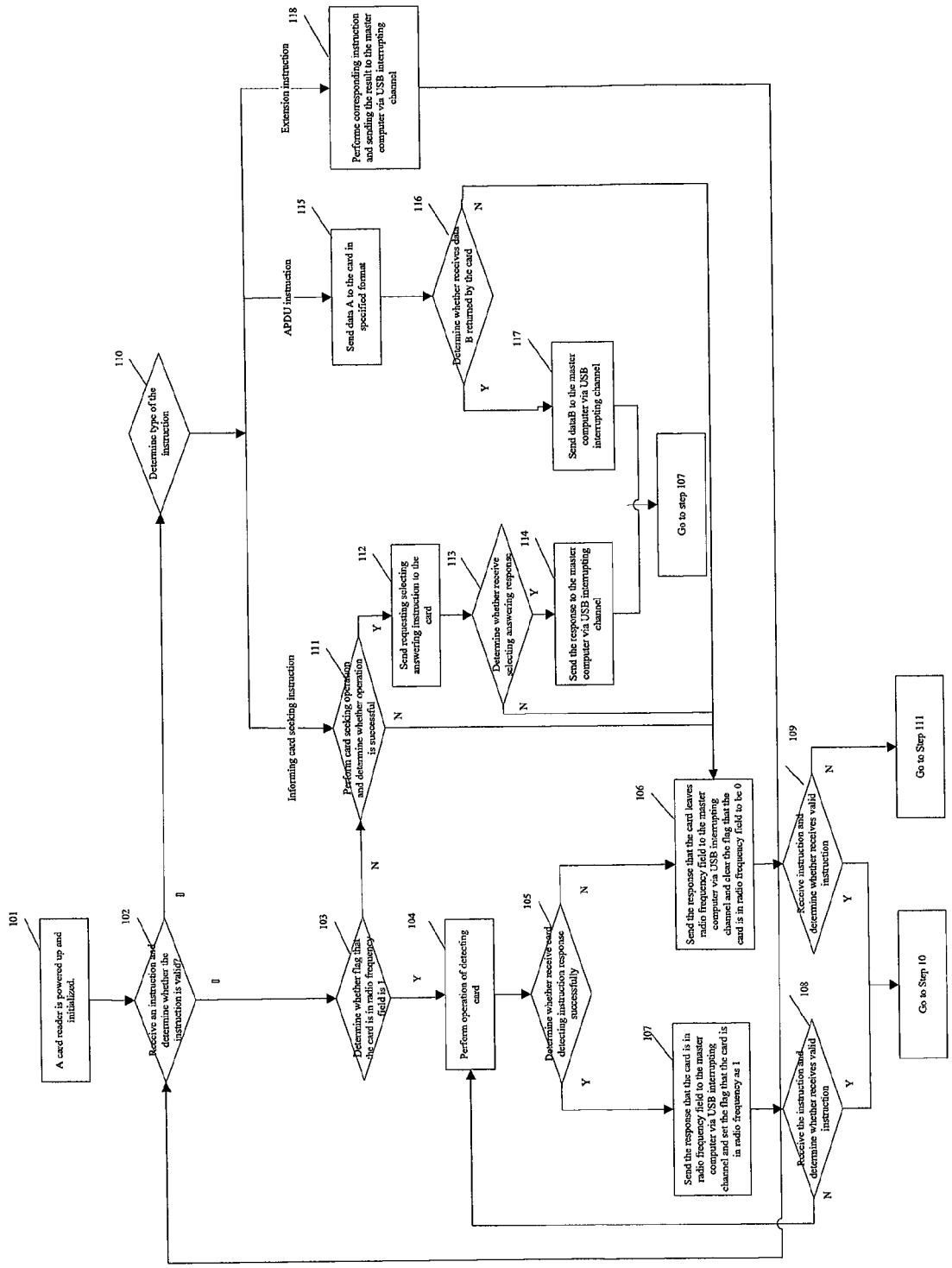
FIG. 1 is a flow chard of a method for detecting whether a contactless CPU card has left radio frequency field provided by Embodiment 1 of the present invention.

Referring to FIG. 1, Embodiment 1 provides a method for detecting whether a card has left radio frequency field, which specifically includes following steps.

Step 101, a card reader is power up and initialized;

In Embodiment 1, the initial value of flag of the card being in radio frequency (RF) field is 0.

Step 102, receive an instruction and determine whether receives a valid instruction;

if yes, goes to Step 110; if no, goes to Step 103.

In Embodiment 1, the card reader receives an instruction sent from buffer via USB interrupting channel. If the first byte of the instruction is in a predetermined category (from 0x01 to 0x03), a valid instruction is received. For example, if the first byte of the received instruction is 0x01, a valid instruction is received. If the card reader does not receive an instruction or the first byte of a received instruction does not satisfy a predetermined value, the received instruction is not valid instruction.

Step 103, determine whether the flag of the card in the radio frequency field is 1;

if yes, go to Step 104; if no, go to Step 111.

Step 104, perform operation of detecting card;

in Embodiment 1, if it is the first time that the card reader performs operation of detecting card, an issued detecting instruction is 0xB2;

If it is not the first time that the card reader performs operation of detecting card, the card reader determines the issued detecting instruction according to the value of the last bit of the first byte of detecting instruction response returned by the card last time. For example, when the value of the last bit is 1, the card reader issues an instruction of 0xB2 to the card; while when the value of the last bit is 0, the card reader issues instruction of 0xB3 to the card.

In process that the card reader sends detecting instruction at regular time, if a detecting instruction is interrupted, when the card reader sends next detecting instruction, the instruction will be changed. For example, the card reader sends detecting instruction 0xB2 to the card; after the card successfully makes corresponding response 0xA3, interruption is caused by interruption instruction; the card reader executes an interruption instruction; after completing of executing the interruption instruction, the card reader sends detecting instruction of 0xB3.

Operation of detecting card specifically includes following steps.

Step A, the card reader sends a detecting instruction at regular time;

In Embodiment 1, the card reader sends a detecting instruction to the card at a predetermined regular time interval; preferably, the predetermined regular time interval is 5 ms.

Step B, receive detecting instruction response made by the card and then go to Step 105;

in Embodiment 1, the received response is 0xA3, or 0xA2, or other data.

Step 105, determine whether the detecting instruction response made by the card is received successfully;

if yes, go to Step 107; otherwise, go to Step 106.

Specific determining method includes if the card reader sends detecting instruction of 0xB2 to the card, the card reader receives 0xA3 returned from the card reader, which means that the card reader receives the detecting instruction response made by the card successfully;

if the card reader sends detecting instruction of 0xB3 to the card, the card reader receives 0xB2 returned from the card reader, which means that the card reader receives the detecting instruction response made by the card successfully; and if the card reader receives other response or a response which does not match its sent detecting instruction, it is regarded that the card reader receives the detecting instruction response unsuccessfully.

Step 106, inform the master computer of a response that the card leaves the radio frequency field via USB interrupting channel, clear flag of the card being in radio frequency field to be 0 and go to Step 109 or go to Step 102;

in Embodiment 1, specifically the response that the card leaves the radio frequency field is 0x50, 0x02.

Step 107, inform the master computer of a response that the card is in the radio frequency field via USB interrupting channel, set the flag of the card in the radio frequency field as 1; then go to Step 108 or go to Step 102;

in Embodiment 1, specifically, the response that the card is in the radio frequency field is 0x50, 0x03.

Step 108, receive an instruction and determine whether receives valid instruction;

if yes, go to Step 110; otherwise, go to Step 104.

Determining method of Step 108 in Embodiment 1 can refer to Step 102. No more detail is given here.

Step 109, receive an instruction and determine whether receives a valid instruction, if yes, go to Step 110; otherwise, go to Step 111.

Determining method of Step 110 in Embodiment 1 can refer to Step 102. No more detail is given here.

Step 110, determine instruction type;

in Embodiment 1, if the first byte of data received by the card reader is 0x01, the type is instruction on informing to seek a card and goes to Step 111;

if the first byte of the received data is 0x02, the data is APDU instruction and goes to Step 115;

if the first byte of the received data is 0x03, the data is extension instruction and goes to Step 118.

In Embodiment 1, extension instruction includes open/close radio frequency field instruction, lamp on/lamp off instruction, buzz instruction, etc.

Step 111, perform operation of the card seeking and determine whether the operation is successful;

in Embodiment 1, for A type card, operation of the card seeking specifically includes Step A-1, sending a first requesting instruction to the card;

in Embodiment 1, the first requesting instruction specifically is 0x52.

Step A-2, determining whether a first response made by the card is received;

in Embodiment 1, the first response is predetermined data which corresponds to the first requesting instruction; preferably, the predetermined data is data with two bytes, for example, 0x02, 0x00;

if yes, goes to Step B-1;

otherwise, closing radio frequency field and the card reader will wait for automatically opening radio frequency field in a predetermined time and then perform Step 106; preferably, the predetermined time period is 10 ms.

Step B-1, sending data packet of 2 bytes, e.g. 0x93, 0x20, to the card;

Step B-2, obtaining a first confirming information returned by the card;

In Embodiment 1, process of obtaining a first confirming information returned by the card includes Step B-21, sending data packet of two bytes, e.g. 0x93 and 0x20, to the card;

Step B-22, determining whether receives a second response data;

In Embodiment 1, the second response data includes UID1 and BCC1; UID1 is a set of fixed data of segment of the card number with four bytes or a random number dynamically generated by the card; BCC1 is check byte of UID1;

if yes, goes to Step B-23;

if no, close radio frequency field; the card reader will wait for automatically opening radio frequency field in a predetermined time and then goes to Step 106; preferably, the predetermined time is 10 ms.

Step B-23, sending data packet made up of 0x93, 0x70, UID1, BCC1 and CRC1 to the card; CRC1 is check detecting code;

Step B-24, determining whether receives a first confirming information returned by the card;

if yes, obtaining the first confirming information and goes to Step C-1;

if no, closing radio frequency field; the card reader will wait for automatically opening radio frequency field in a predetermined time and goes to Step 106; preferably, the predetermined time is 10 ms;

In Embodiment 1, the first confirming information is made up of S and CRC1; S1 represents starting communication.

Step C-1, obtaining a first data which is obtained by performing AND operation on the first confirming information and fixed data;

In Embodiment 1, the fixed data is 0x40.

Step C-2, determining whether the first data is 0x00;

if yes, cascade level of the card is 1 and storing the card information in buffer and goes to Step 112;

if no, goes to Step D-1.

Step D-1, sending data packet with 2 bytes, e.g. 0x95 and 0x20, to the card;

Step D-2, obtaining a second confirming information returned by the card;

In Embodiment 1, process of obtaining the second confirming information includes Step D-21, sending data packet with two bytes, e.g. 0x95 and 0x20, to the card;

Step D-22, determining whether receives a third response data returned by the card;

In Embodiment 1, the third response data include UID2 and BCC2; UID2 is card number segment of 4 bytes; BCC2 is check byte of UID2.

if yes, goes to Step D-23;

if no, closing frequency field; the card reader will wait for automatically opening radio frequency field in a predetermined time and go to Step 106; preferably, the predetermined time is set as 10 ms;

Step D-23, sending data packet made up of 0x95, 0x70, UID2, BCC2 and CRC2 to the card;

Step D-24, determining whether receives a second confirming information returned by the card;

if yes, obtaining the second confirming information returned by the card and goes to Step E-1;

if no, closing radio frequency field; the card reader will wait for automatically opening the radio frequency field in a predetermined time and goes to Step 106; preferably, the predetermined time is set as 10 ms;

in Embodiment 1, the second confirming information is made up of S2 and CRC2; S2 represents starting communication.

Step E-1, obtaining the second data by performing AND operation on the second confirming information and fixed data;

In embodiment 1, the fixed data is 0x40.

Step E-2, determining whether the second data is 0x00;

if yes, the cascade level of the card is 2 and storing the card information in buffer and goes to Step 112;

if no, goes to Step F-1.

Step F-1, sending data packet with two bytes, e.g. 0x97 and 0x20, to the card;

Step F-2, obtaining a third confirming information;

In embodiment 1, process of obtaining the third confirming information includes

Step F-21, sending data packet with two bytes e.g. 0x97 and 0x20, to the card;

Step F-22, determining whether receives a fourth response data returned from the card;

in Embodiment 1, the fourth response data includes UID3 and BCC3; UID3 is card number segment with four bytes; BCC3 is check byte of UID3;

if yes, goes to Step F-23;

if no, closing radio frequency field; the card reader will wait for automatically opening the radio frequency field in a predetermined time and goes to Step 106; preferably, the predetermined time is set as 10 ms;

Step F-23, sending data packet made up of 0x97, 0x70, UID3, BCC3 and CRC3 to the card;

Step F-24, determining whether receives the third confirming information returned from the card;

In Embodiment 1, the third confirming information is made up of S3 and CRC3; S3 represents starting communication.

if yes, obtaining the third confirming information and goes to Step G-1;

if no, closing radio frequency field; the card reader will wait for automatically opening radio frequency field in a predetermined time and goes to Step 106; preferably, the predetermined time is set as 10 ms.

Step G-1, obtaining a third data obtained by performing AND operation on the third confirming information and fixed data to obtain a third data;

in Embodiment 1, the fixed data is 0x40.

Step G-2, determining whether the third data is 0x00;

if yes, cascade level is 3 and storing the card number information in buffer and goes to Step 112;

if no, closing radio frequency field; the card reader will wait for automatically opening radio frequency field in a predetermined time and goes to Step 106; preferably, the predetermined time is set as 10 ms.

In Embodiment 1, the cascade level corresponds to UID1; four bytes of UID1 are all card numbers;

cascade level 2 corresponds to the cascade of UID1 and UID2; the first byte of the UID1 is invalid and only the last three bytes are taken; all four bytes of UID2 are taken; cascade level 2 has data of 7 bytes;

cascade level 3 corresponds to cascade of UID1, UID2 and UID3; the first bytes of the UID1 and UID2 are invalid, only the last three bytes of UID1 and UID2 are taken respectively; all four bytes of UID3 are taken; cascade level 3 has data of 10 bytes.

For B type card, the way of implementation is as the following.

Step l, the card reader sends B type requesting instruction to the card;

In Embodiment 1, specifically, B type requesting instruction is data with 5 bytes: 0x05, 0x00, 0x08, CRC (2 byte).

Step II, determine whether receives a response of B type request returned by the card;

if yes, goes to Step 112, if no, goes to Step 106.

In Embodiment 1, response of B type request specifically includes 0x1d, PUPI (4 bytes), 0x00, 0x08, 0x01, 0x00, CRC (2 bytes); PUPI represents card information.

Step 112, send request selecting and answering instruction to the card;

in Embodiment 1, specifically, the request selecting and answering instruction is E0, 80, CRC.

Step 113, determine whether receives selecting and answering response;

if yes, goes to Step 114; if no, goes to Step 106.

Step 114, send selecting and answering response to the master computer via USB interrupting channel; and goes to Step 107.

Step 115, send data A in specified format to the card;

in Embodiment 1, specified format includes PCB, NAD/CID, data A, CRC; PCB represents Protocol Control Byte; NAD represents Node address; CID represents Card Identifier; CRC represents check detecting code.

Step 116, determine whether receives data B returned by the card;

if yes, goes to Step 117; if no, goes to Step 106.

Step 117, send data B to the master computer via USB interrupting channel; then goes to Step 107.

Step 118, execute corresponding instruction and send executing result to the master computer via USB interrupting channel.

In Embodiment 1, requesting lamp on instruction is taken as an example. After the card reader receives a requesting lamp on instruction sent by the master computer, the card reader performs lamp on operation and sends information of successful operation or failed operation to the master computer via USB interrupting channel. The information of successful operation is 0x00 and the information of failed operation is 0x01.

In Embodiment 1 of the present invention, a response that the related card is in or is not in the radio frequency field is informed to the master computer via USB interrupting channel and the informed response that the card is in the radio frequency field is stored; before preparing for informing next time, determine whether the stored response is identical to a response to be sent, if they are identical, the informing need not be uploaded; otherwise, inform the master computer that the card is in the radio frequency field and stores response.

Embodiment 2

Referring to FIG. 2A and FIG. 2B, Embodiment 2 provides a method for detecting whether a card has left radio frequency filed, which specifically includes Step 201, the card is powered up and initialized;

Switch on regular interrupting.

In Embodiment 2, the initial value of flag of the card in the radio frequency field is 0.

Step 202, receive instruction;

In Embodiment 2, the instruction received by the card reader can be instruction on informing to seek a card, APDU instruction, extension instruction, which are sent by the master computer.

Step 203, determine whether receives valid instruction;

if yes, go to Step 204; otherwise, go to Step 213.

The method of determining is the same as Step 102 in Embodiment 1.

Step 204, determine type of the instruction;

in Embodiment 2, if the first byte of the instruction received by the card reader is 0x01, the type of the instruction is instruction on informing to seek a card and go to Step 205;

If the received first byte of the instruction is 0x02, the type is APDU instruction and go to Step 217;

If the received first byte of the instruction is 0x03, the type is extension instruction and goes to Step 223;

In Embodiment 2, the extension instruction can be open/close frequency field; lamp on/off instruction, buzz instruction, etc.

Step 205, switch off regular interrupting;

Step 206, clear flag of the card in the radio frequency field to be 0;

Step 207, perform card seeking operation and determine whether the operation is successful;

if yes, go to Step 208; otherwise, go to Step 216.

In Embodiment 2, specific card seeking operation is the same as Step 111 in Embodiment 1.

Step 208, sending request selecting and answering instruction to the card;

in Embodiment 2, specifically, the request selecting and answering instruction is E0, 80, CRC.

Step 209, receive and determine whether receives a selecting and answering response;

if yes, go to Step 210; otherwise, go to Step 216.

Step 210, send the selecting and answering response to the master computer via USB interrupting channel;

Step 211, set the flag of the card in the radio frequency field as 1;

Step 212, switch on regular interrupting;

Step 213, determine whether the flag of the card in the radio frequency field is 1;

if yes, go to Step 214; otherwise, go to Step 215.

Step 214, sending a response that the card is in the radio frequency field to the master computer via USB interrupting channel;

then go to the Step 202.

In Embodiment 2, specifically the response that the card is in the radio frequency field is 0x50, 0x03.

Step 215, send response that the card leaves the radio frequency field to the master computer via USB interrupting channel; and then go to Step 202.

In Embodiment 2, specifically, the response that the card leaves the radio frequency field is 0x50, 0x02.

Step 216, clear the flag of the card in the radio frequency field to be 0 and then go to Step 212;

Step 217, switch off regular interrupting;

Step 218, send data A to the card in specified format;

In Embodiment 2, specified format includes PCB, NAD/CID, data A, CRC; PCB represents Protocol Control Byte; NAD represents Node address; CID represents Card Identifier; CRC represents Check detecting code.

Step 219, determine whether receive data B returned by the card;

if yes, go to Step 220; if no, go to Step 222.

Step 220, send data B to the master computer via USB interrupting channel;

Step 221, set flag of the card in the radio frequency field as 1, and then go to Step 212;

Step 222, clear flag of the card in the radio frequency field to be 0, and then go to Step 212;

Step 223, switch off regular interrupting;

Step 224, execute corresponding instruction, and send the executing result to the master computer via USB interrupting channel; and then go to Step 212.

Specific operation method is the same as Step 118 in Embodiment 1.

Shown by FIG. 2B, operation of regular interrupting specifically includes

Step 2-1, entering regular interrupting;

In Embodiment 2, performing interrupting period is predetermined time; preferably, interrupting is performed every 5 ms.

Step 2-2, switching off interrupting;

Step 2-3, clear interrupting;

Step 2-4, determining whether the flag of the card in the radio frequency field is 1;

if yes, go to Step 2-5; if no, go to Step 2-9.

Step 2-5, performing operation of detecting card;

in Embodiment 2, specific operation of detecting card is the same as Step 104 in Embodiment 1.

Step 2-6, determine whether successfully receives response of the card detecting instruction;

if yes, go to Step 2-7; otherwise, go to Step 2-8.

In Embodiment 2, specific operation is the same as Step 105 in Embodiment 1.

Step 2-7, switch on interrupting and exit;

Step 2-8, clear the flag of the card in the radio frequency field to be 0 and then go to Step 2-7;

Step 2-9, perform operation of the card seeking and determine whether the operation is successful;

in Embodiment 2, specific operation is the same as Step 111 in Embodiment 1.

If yes, go to Step 2-10; otherwise, go to Step 2-7.

Step 2-10, send request selecting and answering instruction to the card;

in Embodiment 2, specific request selecting and answering instruction is E0, 80, CRC.

Step 2-11, determine whether receives a selecting and answering response from the card;

If yes, go to Step 2-12; otherwise, go to Step 2-7.

Step 2-12, send the selecting and answering response to the master computer via USB interrupting channel and then go to Step 2-13;

Step 2-13, set the flag of the card in the radio frequency field as 1 and then go to Step 2-7.

In Embodiment 2 of the present invention, a response that the related card is in or is not in the radio frequency field is informed to the master computer via USB interrupting channel and the informed response that the card is in the radio frequency field is stored; before preparing for informing next time, determine whether the stored response is identical to a response to be sent, if they are identical, the informing need not be uploaded; otherwise, inform the master computer that the card is in the radio frequency field and store the response.

Embodiment 2 can be Implemented in Another Method as the Following.

Referring to FIG. 2'A,

Step 201', the card reader is powered up and initialized; Switch on regular interrupting.

In Embodiment 2, initial value of flag of the card in the radio frequency field is 0.

Step 202', receive instruction;

In Embodiment 2, the instruction received by the card reader can be instruction on informing to seek a card, APDU instruction and extension instruction, which are sent by the master computer.

Step 203', determine whether receives a valid instruction;
if yes, go to Step 204'; if no, go to Step 202'.
The determining method is the same as Step 102 in Embodiment 2.

Step 204', determine type of instruction;
in Embodiment 2, if the first byte of the instruction received by the card reader is 0x01, the type of the instruction is instruction on informing to seek a card and go to Step 205';
if the first byte of the received instruction is 0x02, the instruction is APDU instruction and go to Step 214';
if the first byte of the received instruction is 0x03, the instruction is extension instruction and go to Step 218';
In Embodiment 2, extension instruction can be open/close radio frequency field instruction, lamp on/lamp off instruction, buzz instruction, etc.

Step 205', switch off regular interrupting;
Step 206', clear flag of the card in the radio frequency field to be 0;
Step 207', perform operation of the card seeking and determine whether the operation is successful;
if yes, go to Step 208'; if no, go to Step 212'.
In Embodiment 2, specific operation of the card seeking is the same as Step 111 in Embodiment 1.

Step 208', send request selecting and answering instruction to the card;
in Embodiment 2, specific request selecting and answering instruction is E0, 80, CRC.

Step 209', receive and determine whether receives the selecting and answering response;
if yes, go to Step 210'; if no, go to Step 212'.

Step 210', send the selecting and answering response to the master computer via USB interrupting channel;
Step 211', send a response that the card is in the radio frequency field to the master computer via USB interrupting channel; set the flag of the card in the radio frequency field as 1, and go to Step 213';
in Embodiment 2, specifically the response that the card is in the radio frequency field is 0x50, 0x03.

Step 212', send a response that the card leaves radio frequency field to the master computer via USB interrupting channel; clear flag of the card in the radio frequency field to be 0;
in Embodiment 2, specifically, the response that the card leaves the radio frequency field is 0x50, 0x02.

Step 213', switch on regular interrupting, and go to Step 202';
Step 214', switch off regular interrupting;
Step 215', send data A to the card in specific format;
in Embodiment 2, specified format includes PCB, NAD/CID, data A, CRC; PCB represents Protocol Control Byte; NAD represents Node address; CID represents Card Identifier; CRC represents Check detecting code.

Step 216', determine whether receives data B returned from the card;
if yes, go to Step 217'; if no, go to Step 212'.

Step 217', send data B to the master computer via USB interrupting channel and go to Step 211'.
Step 218', switch off regular interrupting;
Step 219', execute corresponding instruction, and send executing result to the master computer via USB interrupting channel and go to Step 213'.
Specific operation method is the same as Step 118 in Embodiment 1.

Referring to FIG. 2'B, specifically, operation of regular interrupting includes
Step 2-1', enter regular interrupting;
in Embodiment 2, period of performing regular interrupting is a predetermined time. Preferably, the regular interrupting is performed every 5 ms.
Step 2-2', switch off interrupting;
Step 2-3', clear interrupting;
Step 2-4', determine whether flag of the card in the radio frequency field is 1;
if yes, go to Step 2-5'; if no, go to Step 2-10'.
Step 2-5', perform operation of detecting card;
in Embodiment 2, specifically the operation of detecting card is the same as Step 104 in Embodiment 1.
Step 2-6', determine whether receives response of detecting card instruction successfully;
if yes, go to Step 2-7'; if no, go to Step 2-8'.
in Embodiment 2, specific determining operation is the same as Step 105 in Embodiment 1.
Step 2-7', inform the master computer of the response that the card is in the radio frequency field via USB interrupting channel; set flag of the card in the radio frequency field as 1 and go to Step 2-9';
Step 2-8', inform the master computer of the response that the card leaves the radio frequency field via USB interrupting channel; clear flag of the card in the radio frequency field to be 0;
Step 2-9', switch on interrupting and exit;
Step 2-10', perform operation of the card seeking and determine whether the operation is successful;
if yes, go to Step 2-11'; if no, go to Step 2-8'.
In embodiment 2, specific operation is the same as Step 111 in Embodiment 1.
Step 2-11', send request selecting and answering instruction to the card;
In Embodiment 2, specifically, request selecting and answering instruction is E0, 80, CRC.
Step 2-12', determine whether receives requesting selecting and answering response from the card;
if yes, go to Step 2-13'; if no, go to Step 2-8'.
Step 2-13', send selecting and answering response to the master computer via USB interrupting channel and go to Step 2-7'.
In Embodiment 2 of the present invention, a response that the related card is in or is not in the radio frequency field is informed to the master computer via USB interrupting channel and the informed response that the card is in the radio frequency field is stored; before preparing for informing next time, determine whether the stored response is identical to a response to be sent, if they are identical, the informing need not be uploaded; otherwise, inform the master computer that the card is in the radio frequency field and store the response.

Embodiment 3

Referring to FIG. 3A and FIG. 3B, Embodiment 3 provides a method for detecting a card leaving radio frequency field, which specifically includes
Step 301, a card reader is power up and initialized;
Switch on communication interrupting.
In Embodiment 3, initial value of instruction flag is 0; the initial value of flag of the card in the radio frequency field is 0.
Step 302, determine whether instruction flag is 1;
if yes, go to Step 311; if no, go to Step 303.

Step 303, determine whether the flag of the card in the radio frequency field is 1;
   If yes, go to Step 304; if no, go to Step 311.
Step 304, perform operation of detecting card;
   in Embodiment 3, specifically operation of detecting card is the same as Step 104 in Embodiment 1.
Step 305, determine whether receives a response of the card detecting instruction successfully;
   if yes, go to Step 306; if no, go to Step 308.
   In Embodiment 3, specifically determining operation is the same as Step 105 in Embodiment 1.
Step 306, inform the response that the card is in the radio frequency field to the master computer via USB interrupting channel; set the flag of the card in the radio frequency field as 1; go to Step 307 or Step 302;
   in Embodiment 3, specifically, the response that the card is in the radio frequency field is 0x50, 0x03.
Step 307, determine whether the instruction flag is 1;
   if yes, goes to Step 310; if no, go to Step 304.
Step 308, inform the master computer of the response that the card leaves radio frequency field and clear flag of the card in the radio frequency field to be 0; go to Step 309 or Step 302;
Step 309, determine whether the instruction flag is 1;
   if yes, go to Step 310; if no, go to Step 311.
Step 310, clear instruction flag to be 0 and determine type of instruction; in Embodiment 3, if the first byte of the data received by the card reader is 0x01, the type is instruction on informing to seek a card and go to Step 311;
   if the first byte of the data received by the card reader is 0x02, the type is APDU instruction and go to Step 315;
   if the first byte of the data received by the card reader is 0x03, the type is extension instruction and go to Step 318;
   In Embodiment 3, the extension instruction includes open/close radio frequency field instruction, lamp on/lamp off instruction, buzz instruction, etc.
Step 311, perform operation of the card seeking and determine whether the operation of determining is successful;
   if yes, go to Step 312; if no, go to Step 308.
   In Embodiment 3, specific operation of the card seeking is the same as Step 111 in Embodiment 1.
Step 312, send a request selecting and answering instruction to the card;
   In Embodiment 3, specifically, the request selecting and answering instruction is E0, 80, CRC.
Step 313, determine whether receives a selecting and answering response from the card;
   if yes, go to Step 314; if no, go to Step 308.
Step 314, send the selecting and answering response to the master computer via USB interrupting channel;
   Then, go to Step 306.
Step 315, send data A to the card in specified format;
   in Embodiment 3, specified format includes PCB, NAD/CID, data A, CRC; PCB represents Protocol Control Byte; NAD represents Node address; CID represents Card Identifier; CRC represents Check detecting code.
Step 316, determine whether receives data B returned from the card;
   if yes, go to Step 317; if no, goes to Step 308.
Step 317; send data B to the master computer via USB interrupting channel and go to Step 306.
Step 318, execute corresponding instruction and send corresponding result to the master computer via USB interrupting channel and go to Step 302.
   Specific operation method is the same as Step 118 in Embodiment 1.

In Embodiment 3, if communication interrupting happens, enter interrupting processing. Shown by FIG. 3B, specific steps are as the following.
   Step 3-1, enter communication interrupting;
   Step 3-2, switch off interrupting;
   Step 3-3, clear interrupting;
   Step 3-4, receive instruction and determine whether receives valid instruction;
      if yes, go to Step 3-5; if no, go to step 3-6.
   In Embodiment 3, specifically determining method is the same as Step 307.
   Step 3-5, set instruction flag as 1;
   Step 3-6, switch on interrupting and exit.
   In Embodiments of the present invention, a response that the revolved card is in or not in the radio frequency field is informed to the master computer via USB interrupting channel and the informed response that the card is in the radio frequency field is stored; before preparing for informing next time, determine whether the stored response is identical to a response to be sent, if they are identical, the informing need not be uploaded; otherwise, inform the master computer that the card is in the radio frequency field and stores the response.

The invention claimed is:
1. A method for detecting whether a contactless CPU card has left a radio frequency field comprising the steps of:
   Step a, a card reader is switched to an interruption enabling condition;
   Step b, the card reader receives an instruction sent by a master computer and determines whether the card reader received a valid instruction, if yes, determining a type of the valid instruction, if the type is an instruction on informing to seek a card, go to Step c; if the type is an APDU instruction, go to Step d; if the type is an extension instruction, go to Step e; otherwise, go to Step f;
   Step c, the card reader switches off the interruption enabling condition, sends a card seeking instruction to the card and determines whether the card reader received a card seeking response returned by the card, if yes, setting a flag in the card to a radio frequency field and switching on the interruption enabling condition, go to Step f; otherwise, resetting the flag in the card to the radio frequency field and switching on the interruption enabling condition, go to Step f;
   Step d, the card reader switches off the interruption enabling condition, sends the APDU instruction to the card and determines whether the card reader received a response returned by the card, if yes, setting the flag in the card to the radio frequency field, sending the received response to the master computer via a USB interrupting channel and switching on the interruption enabling condition, then go to Step f; otherwise, resetting the flag of the card in the radio frequency field and switching on the interruption enabling condition, go to Step f;
   Step e, the card reader switches off the interruption enabling condition, performs an operation according to the extension instruction, sends an operation result to the master computer via the USB interrupting channel and switches on the interruption enabling condition, go to Step f;
   Step f, the card reader determines whether the flag of the card in the radio frequency field is set, if yes, sending a response that the card is in the radio frequency field to the master computer via the USB interrupting channel, then go back to Step a; otherwise, sending the response that the card has left the radio frequency field to the master computer via the USB interrupting channel, then go back to Step a;

when the card reader receives a triggering of the interrupting, entering a regular interrupting process, comprising Step g, the card reader switching off the interruption enabling condition and clearing any interrupting flag;

Step h, the card reader determines whether the flag of the card in the radio frequency field is set, if yes, go to Step i; otherwise, sending the card seeking instruction to the card and determining whether a card seeking response is returned by the card, if yes, go to Step I; otherwise, go to Step m;

Step i, the card reader sends a detecting instruction to the card and determines whether the card reader received a detecting response returned by the card, if yes, storing the detecting response and go to Step I; otherwise, go to Step m;

Step l, the card reader switching on the interruption enabling condition, exiting the interrupting process; and Step m, the card reader resetting the flag of the card in the radio frequency field, switching on the interruption enabling condition, and exiting the regular interrupting process.

2. The method of claim 1, wherein Step c further comprises

Step c11, the card reader switching off the interruption enabling condition, sending a first requesting instruction to the card, determining whether the card reader receives a first response returned by the card, if yes, go to Step c12; otherwise, closing the radio frequency field, waiting for automatically opening the radio frequency field in a predetermined time, resetting the flag of the card in the radio frequency field and switching on the interruption enabling condition, then go to Step f;

Step c12, the card reader sends a second requesting instruction containing 0x93 and 0x20 to the card and obtains a first confirming information returned by the card;

Step c13, the card reader obtaining a first data according to a first confirming information and a fixed data and determining whether the first data is 0x00, if yes, a cascade level of the card is 1, the card number information is stored in buffer, then go to Step c18; otherwise, go to Step c14;

Step c14, the card reader sends a third requesting instruction containing 0x95 and 0x20 to the card and obtains a second confirming information returned by the card;

Step c15, the card reader obtains a second data according to the second confirming information and the fixed data and determining whether the second data is 0x00, if yes, a cascade level of the card is 2 and the card number information is stored in the buffer, then go to Step c18; otherwise, go to Step c16;

Step c16, the card reader sends a fourth requesting instruction containing 0x97 and 0x20 to the card and obtains a third confirming information;

Step c17, the card reader obtains a third data according to the third confirming information and the fixed data and determining whether the third data is 0x00, if yes, the cascade level of the card is 3 and the card number information is stored in the buffer, go to Step c18; otherwise, closing the radio frequency field, waiting for automatically opening the radio frequency field in a predetermined time, resetting the flag of the card in the radio frequency field and switching on the interruption enabling condition, go to Step f;

Step c18, the card reader sends a request selecting and answering instruction to the card and determines whether the card reader received a selecting and answering response returned by the card, if yes, go to Step c19; otherwise, resetting the flag of the card in the radio frequency field and switching on the interruption enabling condition; then go to Step f; and Step c19, the card reader setting the flag of the card in the radio frequency field and sending the selecting and answering response to the master computer via the USB interrupting channel and switching on the interruption enabling condition, then go to Step f.

3. The method of claim 1, wherein Step c further comprises

Step c21, the card reader switches off the interruption enabling condition, sends a fifth requesting instruction to the card and determines whether the card reader received a fifth response returned by the card, if yes, go to Step c22, otherwise, closing the radio frequency field and waiting for automatically opening the radio frequency field, resetting the flag of the card in the radio frequency field and switching on the interruption enabling condition; then go to Step f;

Step c22, the card reader sends a request selecting and answering instruction to the card and determines whether the card reader received a selecting and answering response returned by the card, if yes, go to Step c23; otherwise, resetting the flag of the card in the radio frequency field and switching on the interruption enabling condition; then go to Step f; and Step c23, the card reader setting the flag of the card in the radio frequency field, sending the selecting and answering response to the master computer and switching on the interruption enabling condition, then go to Step f.

4. The method of claim 1, wherein if no valid instruction is received in Step b, waiting for the receiving instruction;

Steps c to f, Steps l to m are replaced with Steps c' to e' and Steps l' to m', respectively;

Step c', the card reader switches off the interruption enabling condition and sends a card seeking instruction to the card and determines whether a card seeking response is returned by the card, if yes, setting the flag of the card in the radio frequency field and sending a response that the card is in the radio frequency field to the master computer via the USB interrupting channel; then go back to Step a; otherwise, resetting the flag of the card in the radio frequency field and sending a response that the card has left the radio frequency field to the master computer via the USB interrupting channel, then go back to Step a;

Step d', the card reader switches off the interruption enabling condition, sends the APDU instruction to the card and determining whether the card reader received a response returned by the card, if yes, setting the flag of the card in the radio frequency field and sending the received response and the response that the card is in the radio frequency field to the master computer via the USB interrupting channel, go back to Step a; otherwise, resetting the flag of the card in the radio frequency field and sending the response that the card is in the radio frequency field to the master computer via the USB interrupting channel, go back to Step a;

Step e', the card reader switching off the interruption enabling condition, performing operation according to the extension instruction and sending the operation result to the master computer via the USB interrupting channel, then go back to Step a;

Step l', the card reader setting the flag of the card in the radio frequency field, sending the response that the card is in the radio frequency field to the master computer via the USB interrupting channel, switching on the interruption enabling condition and exiting the interrupting process; and Step m', the card reader resetting the flag of the card in the radio frequency field, sending the response that the card leaves the radio frequency field to the master computer via the USB interrupting channel, switching on interruption enabling condition and exiting the regular interrupting process.

5. The method of claim 4, wherein Step c' further comprises

Step c'11, the card reader switching off the interruption enabling condition, sending a first requesting instruction to the card and determining whether the card reader received a first response returned by the card, if yes, go to Step c'12; otherwise, closing radio frequency field, waiting for automatically opening the radio frequency field in a predetermined time, resetting the flag of the card in the radio frequency field and sending the response that the card has left the radio frequency field to the master computer via the USB interrupting channel, go back to Step a;

Step c'12, the card reader sending a second requesting instruction containing 0x93 and 0x20 to the card and obtaining a first confirming information returned from the card;

Step c'13, the card reader obtaining a first data according to the first confirming information and the fixed data and determining whether the first data is 0x00, if yes, a cascade level of the card is 1 and storing the card number information is stored in buffer, then go to Step C'18; otherwise, go to Step c'14;

Step c'14, the card reader sending a third requesting instruction containing 0x95 and 0x20 to the card and obtaining a second confirming information returned by the card;

Step c'15, the card reader obtaining a second data according to the second confirming information and the fixed data and determining whether the second data is 0x00, if yes, a cascade level of the card is 2 and the card number information is stored in the buffer, then go to Step c'18; otherwise, go to Step c'16;

Step c'16, the card reader sending a fourth requesting instruction containing 0x97 and 0x20 to the card and obtaining a third confirming information;

Step c'17, the card reader obtaining a third data according to the third confirming information and the fixed data and determining whether the third data is 0x00, if yes, a cascade level of the card is 3 and the card number information is stored in buffer, then go to Step c'18; otherwise, closing the radio frequency field, waiting for automatically opening the radio frequency field in a predetermined time, restoring the flag of the card in the radio frequency field and sending the response that the card has left the radio frequency field to the master computer via the USB interrupting channel, then go back to Step a;

Step c'18, the card reader sending a request selecting and answering instruction to the card and determining whether the card reader receives a selecting and answering response returned by the card, if yes, go to Step c'19; otherwise, resetting the flag of the card in the radio frequency field and sending the response that the card leaves the radio frequency field to the master computer via the USB interrupting channel, then go back to Step a; and Step c'19, the card reader setting the flag of the card in the radio frequency field and sending the selecting and answering response and the response that the card is in the radio frequency field to the master computer via the USB interrupting channel; then go back to Step a.

6. The method of claim 4, wherein Step c' further comprises

Step c'21, the card reader switching off the interruption enabling condition and sending a fifth requesting instruction to the card and determining whether the card reader receives a fifth response returned from the card, if yes, go to Step c'22;

otherwise, closing radio frequency field, waiting for automatically opening on the radio frequency field in a predetermined time, resetting the flag of the card in the radio frequency field and sending the response that the card leaves the radio frequency field to the master computer via the USB interrupting channel, then go back to Step a; and Step c'22, the card reader sends a request selecting and answering instruction to the card and determines whether the card reader received the selecting and answering response returned by the card, if yes, go to Step c'23; otherwise, resetting the flag of the card in the radio frequency field and sending the response that the card leaves the radio frequency field to the master computer via the USB interrupting channel; go back to Step a.

7. The method of claim 1, wherein sending the response that the card is in the radio frequency field to the master computer via the USB interrupting channel specifically comprises determining whether a recorded card status is that the card is in the radio frequency field, if yes, go back to Step a, otherwise, updating the recorded card status to be that the card is in the radio frequency field, go back to Step a; and sending a response that the card has left the radio frequency field to the master computer via the USB interrupting channel further comprises determining whether a recorded card status is that the card has left the radio frequency field, if yes, go back to Step a; otherwise, updating the recorded card status to be that the card leaves the radio frequency field; go back to Step a.

8. The method of claim 1, wherein determining whether the instruction is a valid instruction further comprises the card reader receiving an instruction sent from a buffer via interrupting; if a first byte of the instruction is identical to a predetermined character, the valid instruction is received; otherwise, no valid instruction is received.

9. The method of claim 1, wherein the card reader sending a detecting instruction to the card further comprises if it is the first time that the card reader sends the detecting instruction, the card reader sends a first predetermined character to the card; while if it is not the first time that the card sends the detecting instruction, the card reader determines the detecting instruction to be sent according to the detecting response, if the value of a last bit of the detecting response is 0, the card reader sends a first predetermined character string to the card; if the value of the last bit of the detecting response is 1, the card reader sending a second predetermined character string to the card.

10. The method of claim 9, wherein determining whether the card reader successfully receives the detecting response returned by the card further comprises if the detecting instruction is a first predetermined character string, the card reader determines whether the response returned by the card is a first detecting response, if yes, successfully receiving the detecting response returned by the card and storing the response; if no, unsuccessfully receiving the detecting response returned by the card; while if the detecting instruction is a second predetermined character string, the card reader determines whether the response returned by the card is a second detecting response, if yes, successfully receiving the detecting response returned by the card and storing the response; if no, unsuccessfully receiving the detecting response returned by the card.

* * * * *